United States Patent [19]
MacArthur

[11] Patent Number: 4,796,298
[45] Date of Patent: Jan. 3, 1989

[54] VIDEO DISPLAY UNIT

[75] Inventor: Ian D. MacArthur, Stockport, England

[73] Assignee: International Computers Limited, London, England

[21] Appl. No.: 14,485

[22] Filed: Feb. 13, 1987

[30] Foreign Application Priority Data

Feb. 28, 1986 [GB] United Kingdom ................. 8605014

[51] Int. Cl.⁴ ............................................. H04N 7/167

[52] U.S. Cl. ........................................ 380/14; 380/17; 380/18

[58] Field of Search ................. 380/14 APS, 18 APS, 380/17 APS

[56] References Cited

U.S. PATENT DOCUMENTS

| | | | |
|---|---|---|---|
| 4,245,246 | 1/1981 | Cheung | 380/17 |
| 4,405,942 | 9/1983 | Block et al. | 380/14 |
| 4,669,117 | 5/1987 | Van Eck | 380/14 |

*Primary Examiner*—Stephen C. Buczinski
*Attorney, Agent, or Firm*—Lee & Smith

[57] ABSTRACT

A video display unit is described in which the display is divided into segments, and the order of scanning within each segment is scrambled. A segment may consist, for example, of a row or characters. The scrambling eliminates or reduces the risk of eavesdropping on electromagnetic radiation from the video signal.

9 Claims, 3 Drawing Sheets

VIDEO DISPLAY UNIT

BACKGROUND OF THE INVENTION

This invention relates to video display units (VDUs) for displaying data.

A conventional VDU uses a television raster to display date on a cathode ray tube (CRT). It has been found that the video signal circuits produce electromagnetic radiation which can sometimes be picked up by an eavesdropper using a conventional broadcast TV receiver. One way of overcoming this problem is to provide electromagnetic shielding for the VDU, but this can be very expensive. Another possible solution is suggested in "Electromagnetic Radiation of Information by Video Display Units", W. vanEck et al, Securicom 85 Symposium, Cannes, 6–8 Mar. 1985. This suggests scanning the faster lines in a random order e.g. 7,25,1,199 . . . instead of the conventional 1,2,3,4 . . . . Only if the eavesdropper knows the sequence will he be able to reconstruct the data display. However, this method requires the ability to move the CRT beam between any pair of lines on the CRT screen, and to allow it to settle in the new position with an accuracy of one part in 2000, within the line flyback period, i.e. 5-12 microseconds. This cannot be achieved with conventional scanning circuits and requires very costly special circuits.

The object of the present invention is to provide a way of preventing, or at least reducing the possibility of, eavesdropping which does not suffer from these problems.

SUMMARY OF THE INVENTION

According to the invention there is provided a video display unit having a faster-scanned display arranged to receive a video signal comprising:

means to divide the display into a plurality of segments each consisting of a plurality of adjacent scan lines; and means to scramble the order of scanning within each segment.

BRIEF DESCRIPTION OF THE DRAWINGS

One video display unit in accordance with the invention will now be described by way of example with reference to the accompanying drawings.

CONVENTIONAL VDU

Figure 1:
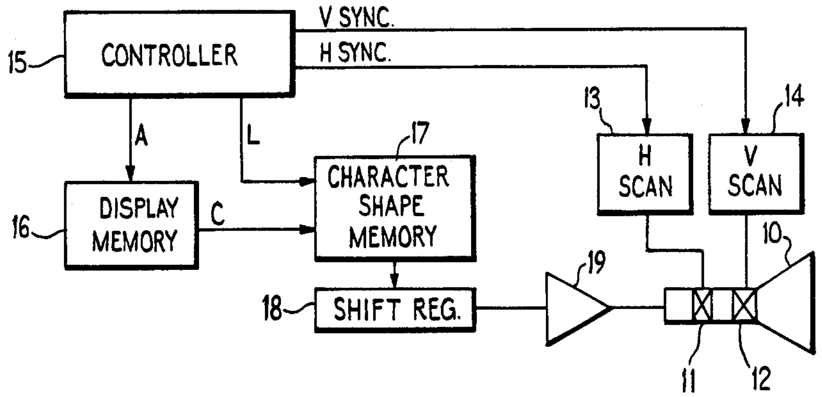
FIG. 1 is a schematic block diagram of a conventional VDU.

Referring to FIG. 1, this shows a conventional VDU comprising a CRT 10 having horizontal and vertical deflection coils 11,12. These coils are driven by respective horizontal and vertical scan circuits 13,14 to produce a conventional faster scan pattern on the screen of the CRT. The scan circuits are synchronised by horizontal and vertical synchronisation signals from a video controller 15. Data is displayed on the screen in the form of characters, arranged in rows and columns, each character comprising a 12×12 array of picture elements (pixels). Each character has a display address which indicates the row and column position of that character on the screen. In operation, the controller 15 produces a display address A which indicates the position of the character currently being scanned by the CRT. This addresses a display memory 16, so as to send out a character code C identifying the character to be displayed at that character position.

The controller 15 also produces a scan line address L which indicates the current scan line within the row of characters currently being scanned. This is applied to a character shaped memory 17, along with the character code C, so as to read out a pattern of 12 bits representing the section of the required character that lies in the current scan line. This pattern of bits is loaded in parallel into a video shift register 18, and then read out serially in synchronisation with the horizontal scanning of the CRT. The output of the shift register 18 is amplified by a video circuit 19, and then applied to the video signal input of the CRT.

DESCRIPTION OF AN EMBODIMENT OF THE INVENTION

Figure 2:
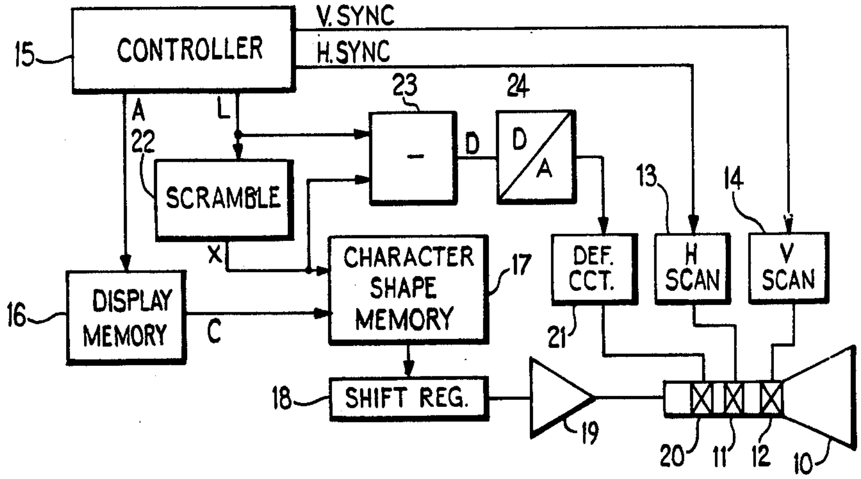
FIG. 2 shows a VDU in accordance with the invention.

Referring now to FIG. 2, this shows a VDU in accordance with the invention. In this figure, parts corresponding to those in FIG. 1 have been given the same reference numerals.

In the VDU shown in FIG. 2, the CRT 10 is provided with an extra vertical deflection coil 20 for producing an additional vertical deflection, in addition to that produced by the normal vertical deflection coil 12. This coil 20 is so positioned as to minimise the coupling with the other coils 11,12, and is capable of providing a vertical deflection equal to one row of characters, and of settling the CRT beam to an accuracy of 0.2 pixels within the horizontal flyback period of 5–12 microseconds. The coil 20 is driven by a deflection circuit 21.

The scan line address L, instead of being fed directly to the character shape memory 17, is fed to a scrambler circuit 22 which shuffles the bits of the address L to produce a scrambled line address X. The scrambled address X is then fed to the address input of the character shape memory 17 along with the character code C, so as to read a pattern of bits into the video shift register 18 as before.

It can be seen that, because the scan line address is scrambled, the scan lines are read out of the character shape memory 17 in a scrambled order. For example, they may be read out in the order 4,2,3,1,5,6,10,8,12,9,7,11 instead of the conventional order 1,2,3 . . . 12.

The scrambled line address X is subtracted from the unscrambled address L, by means of a subtractor circuit 23, to produce a difference signal D which represents the difference in position between the line currently being scanned by the vertical scan circuit 14 and the line represented by the video signal. This difference signal D is applied to a digital-to-analog converter 24, the output of which is fed to the deflection circuit 21 which drives the additional deflection coil 20. This causes the coil 20 to deflect the CRT beam to the position of the line currently represented by the video signal.

Thus, although the lines appear in a scrambled order in the video signal, they are displayed in the correct positions on the CRT screen, so that the displayed image is unaffected by the scrambling. However, because the video signal is scrambled, the possibility of eavesdropping is reduced or eliminated.

Figure 3:
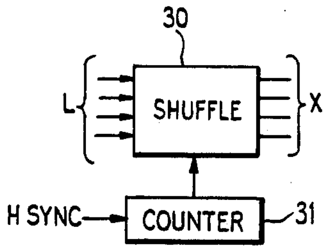
FIG. 3 shows a scrambler circuit used in FIG. 2.

Referring now to FIG. 3, this shows the scrambler circuit 22 in more detail. The circuit comprises a shuffle circuit 30 which receives the 4-bit scan line address L and shuffles the bits in a predetermined manner to produce the scrambled address X. There are 4! (=24) different possible ways of shuffling four bits. These are selected by means of a control code from a 5-bit presettable counter 31. The counter 31 is incremented by the horizontal synchronisation signal at the beginning of each row of characters, so that successive rows of characters are scrambled in different ways.

Figure 4:
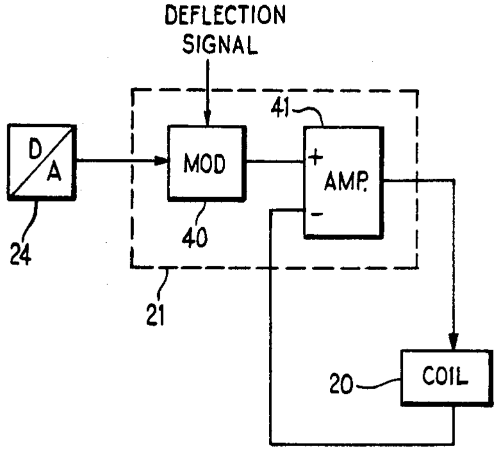
FIG. 4 shows a deflection circuit used in FIG. 2.

Referring now to FIG. 4, this shows the deflection circuit 21 in more detail.

Since the radius of the face of the CRT 10 is larger than the distance from the phosphor to the centre of deflection of the beam, a given increment of current in the coil 20 will result in a larger deflection of the beam near the edge of the screen than in the centre. In other words, the sensitivity of deflection produced by the coil 20 changes as a function of the deflection produced by the main vertical scan coil 12.

In the circuit shown in FIG. 4, the signal from the digital-to-analog converter 24 is applied to a modulator circuit 40 which modulates it in accordance with the value of the main vertical deflection signal from the vertical scan circuit 14. This corrects for the variation in sensitivity of deflection of the coil 20.

The output of the modulator 40 is fed to one input of a differential amplifier 41, the output of which drives the coil 20. The current flowing in this coil provides a feedback signal for the amplifier 41 as shown. This feedback connection enables the desired accuracy in the deflection to be achieved.

Figure 5:
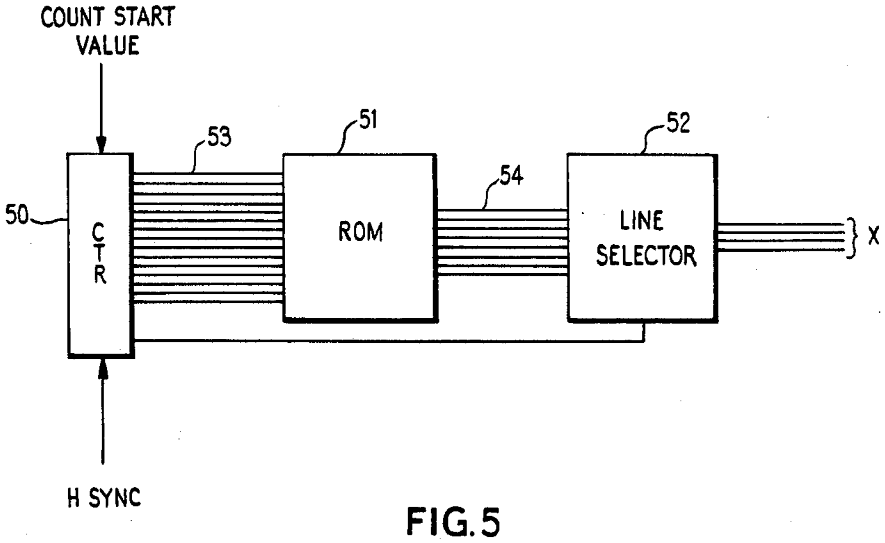
FIG. 5 shows an alternative to the scrambler circuit of FIG. 3.

Referring to FIG. 5, this shows an alternative way in which a scrambled line address X may be produced. This circuit generates a sequence of 4-bit numbers which change at the start of each scan line. The circuit comprises of 16-bit counter 50, a 32K×8 ROM 51 and a line selector 52. The counter 50, which is incremented at the start of each scan line by the horizontal synchronisation signal may be set to any suitable starting value. Fifteen of the sixteen output lines 53 from the counter 50 are used to address the ROM 51, the sixteenth line being used to cause the line selector 52 to select four of the eight data bits produced by the ROM 51 on output lines 54. These four bits form the scrambled address X and are fed to the character snap memory 17 and the subtractor circuit 23.

The data is stored in the ROM 51 in such a way that the 4-bit numbers X follow a sequence whereby, in each group of sixteen consecutive numbers, every number is presented only once. This ensures that every row of the test displayed is fully scanned once.

The described arrangement will produce 4096 sequences of scanning the text before repeating and this sequence can be broken at any convenient time by resetting the counter to a new start value.

It will be realised that this arrangement differs from that of the scrambler arrangement of FIG. 3 in that the scrambled address X in this case is not derived from the unscrambled address L but from the 16-bit counter 50 and the ROM 51.

Although a 4-bit scan line address has been described it will be understood that any number of bits may be employed without departing from the basic principle.

It will be appreciated that many modifications to the arrangement described in FIG. 2 are possible without departing from the invention. For example, the scrambling may be performed on groups of adjacent rows of characters, rather than on a single row. Another possible modification would be to replace the counter 31 in FIG. 3 by a feedback shift register, to give a pseudo-random sequence.

It should also be noted that it is possible to fit the additional deflection coil and the scrambling circuit as an add-on feature to a conventional VDU.

Figure 6:
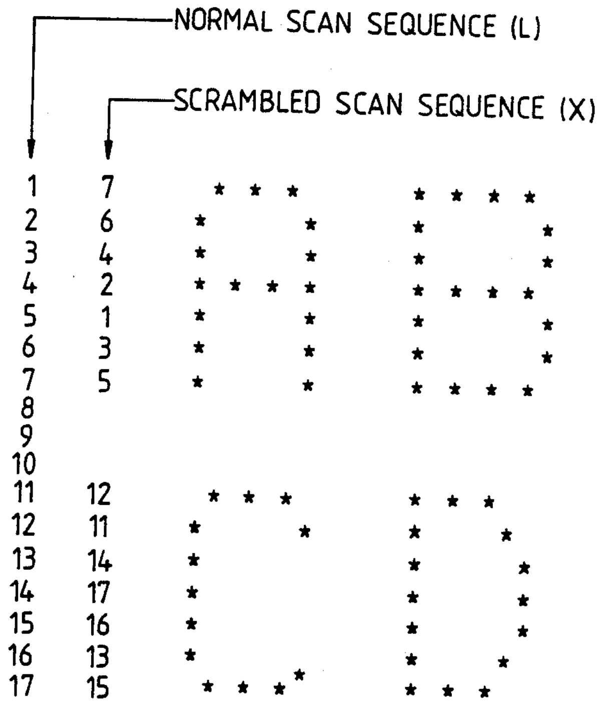
FIG. 6 shows an example of a display, showing the way in which the order of scanning is scrambled.

FIG. 6 shows an example of a part of a display comprising two segments (rows of characters), the first segment consisting of the characters A B and the second segment consisting of the characters C D. In this example, each segment consists of seven scan lines.

FIG. 6 also shows the normal, sequential order for scanning, as indicated by the scan line address L from the controller 15 (FIG. 2), and the scrambled order of scanning, as indicated by the scan line address X. It can be seen that the lines are scrambled on a segment-by-segment basis.

I claim:

1. Video display apparatus comprising:

(a) raster-scanned display means for receiving a video signal and producing a display comprising a sequence of scan lines;

(b) memory means for storing display information defining said display;

(c) means for producing a first sequence of scan line addresses;

(d) means for producing a second, scrambled sequence of scan line addresses;

(e) means for utilizing said second sequence of scan line addresses to read said display information from the memory means in a scrambled order;

(f) means for utilizing said display information read from the memory means to produce said video signal for the display means;

(g) means for forming a difference signal between the first and second sequences of scan line addresses; and (h) control means for utilizing said difference signal to control the display means, to vary the positions of said scan lines in the display.

2. Apparatus according to claim 1 wherein said diplay means comprises a cathode-ray tube, having first and second deflection coils for deflecting an electron beam in horizontal and vertical directions to produce said raster-scanned display.

3. Apparatus according to claim 2 wherein said control means comprising a further deflection coil, for producing an additional vertical deflection.

4. Apparatus according to claim 1 wherein the means for producing the second sequence of scan line addresses comprises a shuffle circuit for scrambling each of said first sequence of scan line addresses.

5. Video display apparatus comprising:

(a) a cathode-ray tube having first and second deflection coils for deflecting an electron beam in horizontal and vertical directions to produce a raster-scanned display comprising a sequence of scan lines;

(b) a further deflection coil for producing an additional vertical deflection;

(c) means for dividing said display into a plurality of segments each segment consisting of a plurality of adjacent scan lines; and (d) means for applying signals to said further deflection coil to scramble the order of said scan lines within each segment.

6. A video display unit according to claim 5 comprising means for compensating for variations in the sensitivity of deflection produced by said additional deflection coil.

7. Video display apparatus comprising:

(a) raster-scanned display means for receiving a video signal and producing a display comprising a sequence of scan lines;

(b) means for dividing said display into a plurality of segments each segment consisting of a plurality of adjacent scan lines; and (c) means for scrambling the order of scanning the lines within each segment on a segment-by-segment basis.

8. Video display apparatus according to claim 7 wherein said segments comprise rows of characters.

9. Video display apparatus according to claim 8 wherein the scrambling is varied in each successive segment.

* * * * *